3,299,178
POLYMERIZATION OF 1,3-BUTADIENE TO PRODUCE CIS 1,4-POLYBUTADIENE IN THE PRESENCE OF STYRENE MONOMER WITH AN ORGANOMETAL AND IODINE CONTAINING CATALYST, FOLLOWED BY STYRENE POLYMERIZATION
James N. Short and Robert S. Hanmer, Bartlesville, Okla., assignors to Phillips Petroleum Company, a corporation of Delaware
No Drawing. Filed Jan. 14, 1963, Ser. No. 251,038
16 Claims. (Cl. 260—880)

This invention relates to high impact resinous compositions. In one aspect, the invention relates to an improved process for preparing high impact resinous compositions.

In recent years a great deal of research has been conducted toward the production of improved rubbery and resinous polymers. Great advances have recently been made in the field of diene polymerization as a result of the discovery of new catalyst systems. These catalyst systems are often described as being "Stereospecific" since they are capable of polymerizing monomers, particularly conjugated dienes, to form a polymer having a certain geometric configuration. One of the products that has attracted widespread interest because of its outstanding and superior properties is a polybutadiene containing a high percentage, e.g., at least 85 percent, of cis 1,4-addition. One of the important uses of this material is in blends with other rubbery synthetic polymers as well as natural rubbers. These blends have found one of their most important applications in the fabrication of automobile and truck tires. Another type of material that is extensively used in the fabrication of various articles, such as toys and household utensils, is high impact resinous compositions. The present invention is concerned with the use of high cis-polybutadiene to provide improved, high impact resinous compositons.

It is an object of this invention, therefore, to provide an improved high impact resinous compositon which is prepared from 1,3-butadiene and a monovinyl aromatic compound.

Another object of the invention is to provide a novel process for preparing a high impact resinous compositon.

Other and further objects of the invention will become apparent to those skilled in the art upon consideration of the accompanying disclosure.

It has previously been suggested to prepare high impact resinous compositions by polymerizing styrene in the presence of unvulcanized natural or synthetic rubber. In these processes, the usual practice is to dissolve the natural or synthetic rubber in the styrene after which the styrene is polymerized. This type of process has been found to be unsatisfactory when applied to a high cis-polybutadiene. The present invention makes it possible to produce an improved resinous compositon in a process which offers many advantages over the processes described in the prior art.

Broadly speaking, the process of this invention comprises the steps of polymerizing 1,3-butadiene with a catalyst system that is capable of producing a polymer having a predominantly cis 1,4-configuration, the polymerization being conducted in the presence of a monovinyl aromatic compound, and thereafter polymerizing the aromatic compound in the substantial absence of any 1,3-butadiene It is seen that the polymerization of the aromatic compound occurs in the presence of cis-polybutadiene, either after substantially all of the butadiene has been polymerized or after any unreacted butadiene has been removed from the polymerization zone as by flashing. The product obtained by this process is a homogeneous compositon which contains a graft copolymer of 1,3-butadiene and the monovinyl aromatic compound, a homopolymer of the aromatic compound, and a homopolymer of 1,3-butadiene. The polybutadiene present in the composition contans at least 85 percent, e.g., from 85 to 98 percent and higher, of cis 1,4-addition. The specific amounts of the copolymer and homopolymers present in the composition will depend, at least to a certain degree, on the amounts of the 1,3-butadiene and the monovinyl aromatic compound employed in the process.

One of the important advantages of the present process resides in the fact that it provides a simplified procedure for preparing a high impact resinous composition. As mentioned above, the usual method involves dissolving a synthetic rubber in styrene and subsequently polymerizing the styrene. In such a process it is initially necessary to prepare the synthetic polymer, including the usual recovery operations, after which the polymer must be chopped or shredded into small pieces prior to dissolution in the styrene monomer. In accordance with the present process, these steps are eliminated by conducting the polymerization of the 1,3-butadiene in the presence of the aromatic compound which initially serves as the diluent. This has been found to be possible since the catalyst system employed in polymerizing the 1,3-butadene is not an effective initiator for the polymerization of styrene Thus, the present invention provides a process whereby a high impact resinous composition is produced in a single operation.

The initial stage of the present process in which bu-tadiene is polymerized is generally conducted at a temperature of 100° C. or less, e.g., at a temperature in the range of 0 to 100° C. The second stage of the process in which the monovinyl aromatic compound is polymerized is generally conducted at a temperature in the range of 50 to 200° C., preferably from 100 to 150° C. As mentioned above, the catalyst system employed in the polymerization of the 1,3-butadiene is ineffective in polymerizing the aromatic compound. While the aromatic compound will polymerize thermally at temperatures above 50° C., it is still possible to employ a temperature up to 100° C. in the first stage of the process without obtaining any substantial polymerization of the aromatic compound. This results from the fact that the polymerization of the 1,3-butadiene occurs very rapidly at an elevated temperature, requiring only a few minutes to complete the polymerization. However, it is not desirable to conduct the first stage polymerization at temperatures higher than 100° C. since at these higher temperatures the polymerization of the aromatic compound becomes more rapid. In a preferred embodiment of the invention, the polymerization of the 1,3-butadiene is effected at a temperature below 40° C., after which the temperature is adjusted to within the range of 50 to 200° C. for the polymerization of the aromatic compound.

The pressure employed in the process of this invention can vary over a relatively wide range Any suitable pressure sufficient to maintain the reaction mixture substantially in the liquid phase can be employed. The pressure will thus depend upon the particular monovinyl aromatic compound utilized and the temperature at which the two stages of the process are conducted. The pressure usually falls in the range of 20 to 700 p.s.i.g.

In carrying out the process of this invention, it is preferred to use styrene as the monovinyl aromatic compound. Other suitable monovinyl aromatic compounds include 2-methylstyrene, 3-methylstyrene, 4-methylstyrene, 3-ethylstyrene, 4-ethylstyrene, 2,4-dimethylstyrene, 2,3,5-trimethylstyrene, 3,5-diethylstyrene, 2-methyl-4-ethylstyrene, and the like. It is also within the scope of the invention to employ mixtures of two or more monovinyl aromatic compounds.

The amounts of the 1,3-butadiene and the monovinyl aromatic compound employed in the process can vary over a relatively wide range. In general, a minor amount of the 1,3-butadiene and a major amount of the aromatic compound are employed. It has been found that resinous compositions having outstanding properties can be prepared by utilizing from 3 to 49 weight percent of 1,3-butadiene and from 97 to 51 weight percent of the aromatic compound. The properties of the resinous compositions can be varied by regulating the amount of the 1,3-butadiene and the aromatic compound employed in the process.

The catalyst system employed in the first stage of the present process in which 1,3-butadiene is polymerized is formed by mixing materials comprising an organometal compound and an iodine-containing component, present either in the free or combined state. This polymerization catalyst produces a cis-polybutadiene containing at least 85 percent cis 1,4-addition. While the second stage of the process in which the monovinyl aromatic compound is polymerized can be carried out thermally in the absence of a catalyst, it is often preferred to employ a peroxide catalyst in order to facilitate polymerization. Examples of suitable peroxides that can be used include benzoyl peroxide, di-tert-butyl peroxide, lauroyl peroxide, and the like.

Any one of a large number of different stereospecific catalyst systems can be used in the initial stage of the present process to polymerize 1,3-butadiene. It is usually preferred to employ a catalyst which is selected from the group consisting of (1) a catalyst formed by mixing materials comprising an organometal compound having the formula $R_mM$, wherein R is an alkyl, cycloalkyl, aryl, alkaryl, aralkyl, alkylcycloalkyl, cycloalkylalkyl, arylcycloalky or cycloalkylaryl radical, M is aluminum, mercury, zinc, beryllium, cadmium, magnesium, sodium or potassium, and $m$ is equal to the valence of the metal M, and titanium tetraiodide, (2) a catalyst formed by mixing materials comprising an organometal compound having the formula $R_nM'$, wherein R is an organo radical as defined above, M' is aluminum, magnesium, lead, sodium or potassium, and $n$ is equal to the valence of the metal M', titanium tetrachloride and titanium tetraiodide, (3) a catalyst formed by mixing materials comprising an organometal compound having the formula $R_aM''$, wherein R is an organo radical as defined above, M'' is aluminum or magnesium and $a$ is equal to the valence of the metal M'', a compound having the formula $TiX_b$, wherein X is chlorine or bromine and $b$ is an integer from 2 to 4, inclusive, and elemental iodine, (4) a catalyst formed by mixing materials comprising an organometal compound having the formula $R_xM'''$, wherein R is an organo radical as defined above, M''' is aluminum, gallium, indium or thallium, and $x$ is equal to the valence of the metal M''', a titanium halide having the formula $TiX_4$, wherein X is chlorine or bromine, and an inorganic halide having the formula $M^{iv}I_c$, wherein $M^{iv}$ is beryllium, zinc, cadmium, aluminum, gallium, indium, thallium, silicon, germanium, tin, lead, phosphorus, antimony, arsenic, and bismuth, and $c$ is an integer from 2 to 5, inclusive, and (5) a catalyst formed by mixing materials comprising an organo compound having the formula $R_xM'''$, wherein R, M''' and $x$ are as defined above, titanium tetraiodide, and an inorganic halide having the formula $M^vX_d$, wherein $M^v$ is aluminum, gallium, indium, thallium, germanium, tin, lead, phosphorus, antimony, arsenic or bismuth, X is chlorine or bromine, and $d$ is an integer from 2 to 5, inclusive. The R radicals of the aforementioned formulas preferably contain up to and including 20 carbon atoms.

The following are examples of preferred catalyst systems which can be used to polymerize 1,3-butadiene to a cis 1,4-polybutadiene: triisobutylaluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide and iodine; n-amylsodium and titanium tetraiodide; phenylsodium and titanium tetraiodide; n-butylpotassium and titanium tetraiodide; phenylpotassium and titanium tetraiodide; n-amylsodium, titanium tetrachloride and titanium tetraiodide; triphenylaluminum and titanium tetraiodide; triphenylaluminum, titanium tetraiodide and titanium tetrachloride; triphenylaluminum, titanium tetrachloride and iodine; tri-alpha-naphthylaluminum, titanium tetrachloride and iodine; tribenzylaluminum, titanium tetrabromide and iodine; diphenylzinc and titanium tetraiodide; di-2-tolylmercury and titanium tetraiodide; tricyclohexylaluminum, titanium tetrachloride and titanium tetraiodide; ethylcyclopentylzinc and titanium tetraiodide; tri(3-isobutylcyclohexyl)aluminum and titanium tetraiodide; tetraethyllead, titanium tetrachloride and titanium tetraiodide; trimethylphenyllead, titanium tetrachloride and titanium tetraiodide; diphenylmagnesium and titanium tetraiodide; di-n-propylmagnesium, titanium tetrachloride and titanium tetraiodide; dimethylmagnesium, titanium tetrachloride and iodine; diphenylmagnesium, titanium tetrabromide and iodine; methylethylmagnesium, and titanium tetraiodide; dibutylberyllium and titanium tetraiodide; diethylcadmium and titanium tetraiodide; diisopropylcadmium and titanium tetraiodide; triisobutylaluminum, titanium tetrachloride, and antimony triiodide; triisobutylaluminum, titanium tetrachloride and aluminum triiodide; triisobutylaluminum, titanium tetrabromide, and aluminum triiodide; triethylaluminum, titanium tetrachloride and phosphorus triiodide; tri-n-dodecylaluminum, titanium tetrachloride, and tin tetraiodide; triethylgallium, titanium tetrabromide, and aluminum triiodide; tri-n-butylaluminum, titanium tetrachloride, and antimony triiodide; tricyclopentylaluminum, titanium tetrachloride, and silicon tetraiodide; triphenylaluminum, titanium tetrachloride, and gallium triiodide; triisobutylaluminum, titanium tetraiodide and tin tetrachloride; triisobutylaluminum, titanium tetraiodide and antimony trichloride; triisobutylaluminum, titanium tetraiodide and aluminum trichloride; triisobutylaluminum, titanium tetraiodide, and tin tetrabromide; triethylgallium, titanium tetraiodide, and aluminum tribromide; triethylaluminum, titanium tetraiodide, and arsenic trichloride; and tribenzylaluminum, titanium tetraiodide, and germanium tetrachloride.

The amount of the catalyst employed in the first stage of the process to polymerize 1,3-butadiene can vary over a rather wide range. The amount of the organometal used in forming the catalyst composition is usually in the range of 0.75 to 20 mols per mol of the halogen-containing component, i.e., a metal halide with or without a second metal halide or elemental iodine. The mol ratio actually used in a polymerization will depend upon the particular components employed in the catalyst system. However, a preferred mol ratio is generally from 1:1 to 12:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide, the mol ratio of the tetrachloride or tetrabromide to the iodide is usually in the range of 0.05:1 to 5:1. With a catalyst system comprising an organometal compound, a titanium chloride or bromide and elemental iodine, the mol ratio of titanium halide to iodine is generally in the range of 10:1 to 0.25:1, preferably 3:1 to 0.25:1. The concentration of the total catalyst composition, i.e., organometal and halogen-containing component, is usually in the range of 0.01 to 10 weight percent, preferably in the range of 0.01 to 5 weight percent, based on the total amount of 1,3-butadiene charged to the reactor system.

The amount of the peroxide catalyst, when used in the second stage of the process to facilitate the polymerization of the monovinyl aromatic compound, can also vary within rather wide limits. An amount in the range of 0.001 to 5 weight percent of the peroxide catalyst, based on the monovinyl aromatic compound, is usually used. When employing a peroxide catalyst, this material also acts to inactivate the catalyst system employed for the polymerization of the 1,3-butadiene.

Various materials are known to be detrimental to the catalyst employed in polymerizing the 1,3-butadiene. These materials include carbon dioxide, oxygen and water. It is usually desirable, therefore, that the butadiene and the monovinyl aromatic compound be freed of these materials as well as other materials which may tend to inactivate the catalyst. Furthermore, it is desirable to remove air and moisture from the reaction vessel or vessels in which the polymerizations are to be conducted. It is to be understood that a small amount of these materials can be tolerated. However, the amounts present must not be sufficient to inactivate completely the catalyst employed in the polymerization of the butadiene.

The process of this invention can be carried out as a batch process by charging 1,3-butadiene to a reactor containing a monovinyl aromatic compound and the catalyst used to polymerize the butadiene. Although any suitable charging procedure can be used, it is often preferred to add the catalyst components to a reactor containing 1,3-butadiene and an aromatic compound. It is also within the scope of the invention to preform the catalyst by mixing the catalyst components, i.e., the organometal compound and the iodine-containing component, within a separate catalyst separation vessel. The resulting reaction mixture can then be charged to the reactor containing 1,3-butadiene and a monovinyl aromatic compound, or these latter materials can be added after the catalyst. After completion of the first stage of the process in which 1,3-butadiene is polymerized, the monovinyl aromatic compound is then polymerized in the second stage of the process. If a temperature below 50° C. was used in the first stage, the temperature is adjusted so that the second stage is conducted at a temperature in the range of 50 to 200° C. If the temperature used in the first stage was above 50° C., this same temperature can be employed in the second stage. However, it may be desirable to increase the temperature if necessary in order to operate in the preferred temperature range of 100 to 150° C. If a peroxide catalyst is employed, it is also added at this point in the process. The time required for the completion of the first stage of the process will vary with the reaction conditions employed. At elevated temperatures approaching 100° C., the time required to polymerize the butadiene is very short, e.g., from 5 to 10 minutes. At lower temperatures the time required may be as high as 24 hours or longer. The time required to carry out the second stage of the process will also depend upon the temperature employed and whether a catalyst is utilized. The time required for polymerizing the monovinyl aromatic compound is usually in the range of 1 hour to 48 hours or longer. The process of this invention can also be carried out in a semi-continuous manner by utilizing two or more reaction vessels. When proceeding in this manner, the polymerization of the 1,3-butadiene is accomplished in a first reactor or series of reactors while the polymerization of the monovinyl aromatic compound is carried out in a second reactor or series of reactors.

For many applications, it is desirable that the resinous compositions of this invention be substantially free of catalyst residues which result from the first stage of the process. In order to accomplish this removal of catalyst residues, it is usually preferred to treat the reaction mixture obtained in the first stage of the process prior to commencement of the second stage of the process. This treatment can be accomplished by contacting the effluent comprising a solution of polybutadiene in a monovinyl aromatic compound, which is recovered from a first polymerization zone in which the first stage is conducted, with a catalyst treating agent, such as water, an alcohol, an inorganic acid, or mixtures of these materials, in a catalyst treating zone. Examples of suitable alcohols and acids include isopropyl alcohol, isobutyl alcohol, hydrochloric acid, sulfuric acid and the like. After contacting the effluent recovered from the first stage of the process with the treating agent, the treating agent and catalyst residues are then separated from the effluent by any suitable means, such as by decantation or centrifugation. The resulting treated effluent contains only a small amount of catalyst residues, e.g., 0.01 weight percent or less, an amount which does not have a deleterious effect on the color or physical properties of the final product. The treated effluent is then passed into a second polymerization zone wherein the aromatic compound is polymerized.

The compositions of this invention have utility and applications where high impact polystyrenes are normally used. They are particularly useful in preparing molded articles, such as toys, household utensils and mechanical goods.

A more comprehensive understanding of the invention can be obtained by referring to the following illustrative examples which are not intended, however, to be unduly limitative of the invention.

Example I

Butadiene was polymerized in the presence of a catalyst system formed by mixing triisobutylaluminum, titanium tetrachloride and iodine. Styrene was used as the diluent for the polymerization. The following recipe was employed:

| | Parts by weight |
|---|---|
| 1,3-butadiene | 100. |
| Styrene | 928. |
| Triisobutylaluminum | 0.950 (4.8 mhm.[1]). |
| Iodine | 0.178 (0.7 mhm.). |
| Titanium tetrachloride | 0.076 (0.4 mhm.). |
| Temperature ° C. | 30. |
| Time, hours | 4.17. |

[1] Millimols per 100 parts of 1,3-butadiene.

Styrene was charged first after which the reactor was purged with nitrogen. Butadiene was added first, after which triisobutylaluminum, iodine, and titanium tetrachloride were charged in that order. Approximately 53 percent of the butadiene polymerized in the time allowed, giving a concentration of polybutadiene in styrene of 5.4 weight percent. The polymer had an inherent viscosity of 1.61.

Benzoyl peroxide was added to a sample of the solution of polybutadiene in styrene using 2.26 parts by weight per 100 parts by weight of the polymer solution. The mixture was heated at a temperature of 57° C. for 24 hours. Under these conditions the total monomer conversion was 98 percent. The product was a colorless milky appearing solid, capable of being molded under heat and pressure.

A second sample of the polymer solution was treated with benzoyl peroxide. In this run 3.38 parts by weight was used per 100 parts by weight of the polymer solution. After heating under the conditions used in the first run, the product had the same appearance and was a solid, moldable plastic.

Example II

Butadiene was polymerized in the presence of styrene as the diluent using the catalyst system of Example I. The amount of styrene employed was 1876 parts by weight. Otherwise the recipe was the same as in the preceding example. Approximately 64 percent of the butadiene polymerized in 4 hours and 24 minutes, giving a concentration of polybutadiene in styrene of 3.3 weight percent. The polymer had an inherent viscosity of 3.2.

Two samples of the polymer solution (polybutadiene in styrene) were treated with benzoyl peroxide as in Example I to effect polymerization of the styrene. The amounts of peroxide used were 2.26 and 3.38 parts by weight, respectively, per 100 parts by weight of the polymer solution. The mixtures were maintained at a temperature of 57° C. for 24 hours. Total monomer conversion was 97 percent in the first run while in the second run it was 96 percent. The solid products that were obtained were similar to those of Example I.

*Example III*

Two runs were made to demonstrate the production of cis-polybutadiene in the presence of styrene as the diluent. A triisobutylaluminum-titanium tetraiodide initiator was employed. A control run was made in which the diluent was toluene. The following recipes were employed:

|  | Parts by Weight | | |
|---|---|---|---|
|  | 1 | 2 | 3 |
| 1,3-butadiene | 100 | 100 | 100 |
| Styrene | 940 | 940 |  |
| Toluene |  |  | 1,200 |
| Triisobutylaluminum (TBA) | 0.950 | 0.034 | 0.475 |
| Titanium tetraiodide (TTI) | 0.222 | 0.222 | 0.222 |
| Mol ratio, TBA/TTI | 12/1 | 8/1 | 6/1 |
| Temperature, °F | 41 | 41 | 41 |
| Time, hours | 4 | 4 | 4 |
| Conversion, percent | 44 | 58 | 55 |

The diluent was charged first after which the reactor was purged with nitrogen. Butadiene was then added followed by triisobutylaluminum and the titanium tetraiodide. At the conclusion of the polymerization period, the products were coagulated with isopropyl alcohol. They were redissolved in cyclohexane twice and coagulated before final conversion was determined. Following are results of inherent viscosity, index of refraction, and microstructure determinations on each of the products.

|  | 1 | 2 | 3 |
|---|---|---|---|
| Inherent Viscosity [1] | 2.33 | 2.94 | 2.58 |
| Index of refraction at 25° C | 1.5220 | 1.5223 | 1.5218 |
| Microstructure, percent [2]: |  |  |  |
| Cis | 95.6 | 95.4 | 95.8 |
| Trans | 1.2 | 1.3 | 1.1 |
| Vinyl | 3.2 | 3.3 | 3.1 |

[1] The inherent viscosity in this example as well as in the preceding examples was determined as described below. One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

[2] A polymer sample was dissolved in carbon disulfide to form a solution having 25 grams of polymer per liter of solution. The infrared spectrum of the solution (percent transmission) was then determined in a conventional infrared spectrometer. The percent of the total unsaturation present as trans 1,4- was calculated according to the following equation and consistent units: $\epsilon = E/tc$, where $\epsilon$ = extinction coefficient (liters-mols$^{-1}$-centimeters$^{-1}$); $E$ = extinction (log $I_0/I$); $t$ = path length centimeters); and $c$ = concentration (mols double bond/liter). The extinction was determined at the 10.35 micron band and the extinction coefficient was 146 (liters-mols$^{-1}$-centimeters$^{-1}$). The percent of the total unsaturation present as 1,2- (or vinyl) was calculated according to the above equation, using the 11.0 micron band and an extinction coefficient of 209 (liters-mols$^{-1}$-centimeters$^{-1}$). The percent of the total unsaturation present as cis 1,4- was obtained by subtracting the trans 1,4- and 1,2- (vinyl) determined according to the above procedure from the theoretical unsaturation, assuming one double bond per each C$_4$ unit in the polymer.

Infrared and ultraviolet examination of the products gave no indication of the presence of either polystyrene or butadiene/styrene copolymer. In addition, the index of refraction and microstructure also showed no evidence that the polymers prepared in styrene were different from the polybutadiene prepared in control run 3 in which toluene was used as the diluent.

As will be evident to those skilled in the art, many variations and modifications of this invention can be practiced in view of the foregoing disclosure. Such variations and modifications are believed to come within the spirit and scope of the present invention.

We claim:

1. A polymerization process which comprises polymerizing a major amount of 1,3-butadiene charged to a polymerization zone with a catalyst formed by mixing materials comprising an organometal compound and an iodine-containing component in the presence of a monovinyl aromatic compound to produce a homopolymer of butadiene having at least 85 percent cis-1,4-addition, said 1,3-butadiene being charged to said zone in an amount of from 3 to 49 weight percent and correspondingly said monovinyl aromatic compound being present in an amount of from 97 to 51 weight percent; and thereafter polymerizing said monovinyl aromatic compound in the substantial absence of 1,3-butadiene and in the presence of the previously polymerized polybutadiene.

2. A process for preparing a high impact resinous composition which comprises polymerizing a major amount of 1,3-butadiene charged to a polymerization zone with a catalyst formed by mixing materials comprising an organometal compound and an iodine-containing component selected from the group consisting of elemental iodine and inorganic iodides in the presence of a monovinyl aromatic compound to produce a homopolymer of butadiene having at least 85 percent cis-1,4-addition, said 1,3-butadiene being charged to said zone in an amount of from 3 to 49 weight percent and correspondingly said monovinyl aromatic compound being present in an amount of from 97 to 51 weight percent, said polymerizing occurring at a temperature in the range of 0 to 100° C.; thereafter polymerizing said monovinyl aromatic compound at a temperature in the range of 50 to 200° C. and in the presence of the previously polymerized polybutadiene; and recovering a high impact resinous composition.

3. A process according to claim 2 in which said catalyst is formed by mixing materials consisting essentially of a trialkylaluminum and titanium tetraiodide.

4. A process according to claim 2 in which said catalyst is formed by mixing materials consisting essentially of a trialkylaluminum, titanium tetrachloride and titanium tetraiodide.

5. A process according to claim 2 in which said catalyst is formed by mixing materials consisting essentially of a trialkylaluminum, titanium tetrachloride and iodine.

6. A process according to claim 2 in which said catalyst is formed by mixing materials consisting essentially of a trialkylaluminum, titanium tetrachloride and aluminum triiodide.

7. A process according to claim 2 in which said catalyst is formed by mixing materials consisting essentially of a trialkylaluminum, titanium tetraiodide and aluminum trichloride.

8. A process for preparing a high impact resinous composition which comprises polymerizing a major amount of 1,3-butadiene charged to a polymerization zone with a catalyst formed by mixing materials comprising an organometal compound and an iodine-containing component selected from the group consisting of elemental iodine and inorganic iodides in the presence of styrene to produce a homopolymer of butadiene having at least 85 percent cis-1,4-addition, said 1,3-butadiene being charged to said zone in an amount of from 3 to 49 weight percent and correspondingly said styrene being present in an amount of from 97 to 51 weight percent, said polymerizing occurring at a temperature below 40° C.; thereafter adjusting the polymerization temperature to a temperature in the range of 50 to 200° C. and polymerizing said styrene in the presence of the previously polymerized polybutadiene, the pressure during the polymerization of said 1,3-butadiene and of said styrene being sufficient to maintain said 1,3-butadiene and styrene in liquid phase; and recovering the high impact resinous composition so prepared.

9. A process for preparing a high impact resinous composition which comprises polymerizing a major amount of 1,3-butadiene charged to a polymerization zone with a catalyst formed by mixing materials comprising an organometal compound and an iodine-containing component selected from the group consisting of elemental iodine and inorganic iodides in the presence of a monovinyl aromatic compound to produce a homopolymer of butadiene having at least 85 percent cis-1,4-addition, said 1,3-butadiene being charged to said zone in an amount of from 3 to 49 weight percent and correspondingly said monovinyl aromatic compound being present in an amount of from 97 to 51 weight percent, said polymerizing occurring at a temperature in the range of 0 to 100° C.; thereafter adding a peroxide catalyst to inactivate said catalyst formed by mixing materials comprising an organometal compound and an iodine containing component and polymerizing said monovinyl aromatic compound in the presence of the previously polymerized polybutadiene and said peroxide catalyst and at a temperature in the range of 50° C. to 200° C.; and recovering a high impact resinous composition.

10. A process for preparing a high impact resinous composition which comprises polymerizing a major amount of 1,3-butadiene charged to a first polymerization zone with a catalyst formed by mixing materials comprising an organometal compound and an iodine-containing component selected from the group consisting of elemental iodine and inorganic iodides in the presence of a monovinyl aromatic compound to produce a homopolymer of butadiene having at least 85 percent cis-1,4-addition, said 1,3-butadiene being charged to said zone in an amount of from 3 to 49 weight percent and correspondingly said monovinyl aromatic compound being present in an amount of from 97 to 51 weight percent, said polymerizing occurring at a temperature in the range of 0 to 100° C.; thereafter withdrawing from said first polymerization zone an effluent comprising a solution of polybutadiene in said monovinyl aromatic compound and catalyst residues; contacting said effluent with a catalyst treating agent in a catalyst treating zone; recovering from said catalyst treating zone said effluent substantially free of said catalyst residues; introducing said treated effluent comprising a solution of polybutadiene in said monovinyl aromatic compound into a second polymerization zone; polymerizing said monovinyl aromatic compound in said second polymerization zone, said polymerizing occurring at a temperature in the range of 50 to 200° C.; and recovering from said second polymerization zone a high impact resinous composition.

11. A process according to claim 10 in which said catalyst treating comprises an alcohol.

12. A process according to claim 10 in which said catalyst treating agent comprises an inorganic acid.

13. The process of claim 1 wherein said monovinyl aromatic compound is styrene.

14. The process of claim 2 wherein said monovinyl aromatic compound is styrene.

15. The process of claim 9 wherein said monovinyl aromatic compound is styrene.

16. The process of claim 10 wherein said monovinyl aromatic compound is styrene.

References Cited by the Examiner

UNITED STATES PATENTS

| 2,762,790 | 9/1956 | Greene | 260—880 |
| 3,178,402 | 4/1965 | Smith et al. | 260—880 |

FOREIGN PATENTS

| 838,996 | 6/1960 | Great Britain. |

MURRAY TILLMAN, *Primary Examiner.*

P. LIEBERMAN, *Assistant Examiner.*